United States Patent [19]

Lakin et al.

[11] 4,446,363
[45] May 1, 1984

[54] TARGET FOR OPTICALLY ACTIVATED SEEKERS AND TRACKERS

[75] Inventors: Charles T. Lakin, Fredericksburg; Norman F. Willett, Colonial Beach, both of Va.

[73] Assignee: The United States of America as represented by the Secretary of the Navy, Washington, D.C.

[21] Appl. No.: 353,682

[22] Filed: Mar. 1, 1982

[51] Int. Cl.³ .............................................. G01J 1/20
[52] U.S. Cl. ................................ 250/203 R; 244/3.16
[58] Field of Search ........................... 250/203 R, 495; 244/3.16; 356/148, 152; 73/1 R

[56] References Cited

U.S. PATENT DOCUMENTS

| 3,944,167 | 3/1976 | Figler et al. | 250/203 R |
| 4,309,746 | 1/1982 | Rushworth | 244/3.16 |
| 4,388,646 | 6/1983 | Strother | 250/203 R |

Primary Examiner—David C. Nelms
Assistant Examiner—J. Brophy

[57] ABSTRACT

A target for optically activated seekers and trackers (TOAST) which provides for calibrated and variable target characteristics such as size, intensity, spatial position, color and interfering background. The TOAST has a first ilumination system providing a target light beam through an adjustable iris which controls image size. The target beam passes through a collimator lens which focuses the light at infinity. With the target beam focused at infinity, the motion of an elevation plate lengthens or shortens the distance from the collimator lens to a one motion mirror. The target beam is attenuated by a variable filter driven by a servo-motor, and a color selection process is provided by passing the beam through spectral filters. A focusing lens and attendant mirror lengthen or shorten the distance from the one motion mirror to the focusing lens and mirror, which is orthogonal with the one motion mirror, thus providing an X-Y movement of the target image formed by the focusing lens. The target image is formed in a plane and reflected by a beamsplitter mirror to a main objective lens which emanates the light focused at infinity. A background light beam with background imagery is provided to the beamsplitter mirror and mixed with the target image so as to simulate the target environment encountered by an operating optically activated seeker and tracker.

14 Claims, 1 Drawing Figure

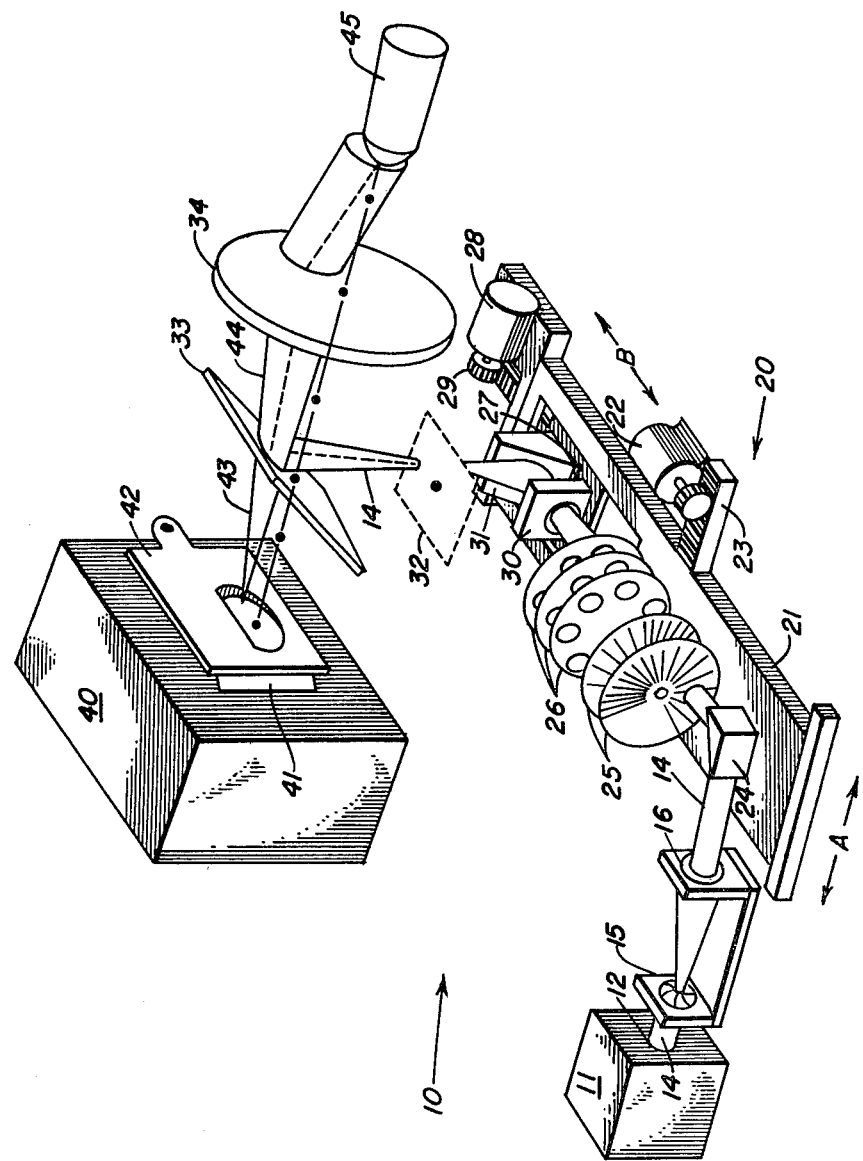

TARGET FOR OPTICALLY ACTIVATED SEEKERS AND TRACKERS

BACKGROUND OF THE INVENTION

The present invention relates to a target for optically activated seekers and trackers and more particularly to a simulated target for testing optically activated seekers and trackers which provides for calibrated and variable target characteristics such as size, intensity, spectral emission, spatial position and interfering background.

An optically activated seeker is designed to detect and home-in on radiation, such as infrared or laser, reflected or emitted from a target.

Previously, a crude system of mounting a small lamp or diode, if the seeker was designed for a laser, on a plotting board was used for testing optically activated seekers. The plotting board was positioned 10 feet in front of the seeker, using the X-AND-Y motions to simulate target motion.

The plotting board system was disadvantageous in that the seeker had to be disassembled and focused for the test at a 10 foot distance, then disassembled and refocused after the test. In addition, the plotting board target could not provide for changes in target intensity or target size. More importantly, the plotting board system could not provide a competitive background to test the ability of the seeker to reject interfering targets.

Additional prior art target simulators for optically activated seekers are disclosed in U.S. Pat. No. 4,021,662 to Mimms and U.S. Pat. No. 3,857,042 to LaGrange et al.

The device of Mimms simulates a target for a laser seeker by means of a convex spherical mirror segment that reflects light from various point sources of light onto the light receiving aperture of a laser seeker. The point sources of light are positioned at the mirror focal point with one source at the laser seeker boresight and another source displaced from and rotatable about the first source. A continuous wave source of light is also provided. The target simulator of Mimms is provided with controls for coded operation and power level manipulation of the point sources of light. The simulator of Mimms does not provide for variations in target size or spatial position and also does not provide an interfering background for testing the ability of the seeker to reject interfering targets.

The laser seeker test set of LaGrange et al simulates a moving light emitting target by sequencing a plurality of small light emitting diodes at a rate not exceeding the tracking rate of the laser seeker being tested. Digital circuitry is used to determine the sequence and timing of the diodes and also provides for manually sequencing the diodes as desired. The diodes emit a collimated beam of energy at different angles to the longitudinal axis of the seeker. By observing the seeker with instrumentation, the tracking capability of the seeker can be determined. The simulator of LaGrange et al does not provide for variations in target size or intensity and again does not provide an interfering background for testing the ability of the seeker to reject interfering targets.

SUMMARY OF THE INVENTION

Accordingly, there is provided in the present invention a target for optically activated seekers and trackers (TOAST) which provides for calibrated and variable target characteristics such as size, intensity, spectral region, spatial position and interfering background. The simulated target can be varied as to size, intensity, position in space, color and background for testing the seeker capability for both tracking the target and rejecting false targets produced by the background.

The target simulator has a first illumination system which provides a target light beam to an adjustable mechanical iris. The mechanical iris becomes the object to be imaged by a collimator lens. The target beam passes through a collimeter lens which focuses the light at infinity.

With the image of the iris focused at infinity, a first elevation plate or a platform adapted for movement in a first direction, lengthens or shortens the distance from a collimator lens to a mirror which is mounted on the platform, but it does not change the infinite focus.

The intensity of the iris image is attenuated by a servo-motor driven variable filter while the color of the target beam is varied by passing the target image (the image of the iris) through selected spectral filters.

A lens and attendant mirror are mounted on a second elevation plate or platform, adapted for movement in a second direction, and the second movable platform lengthens or shortens the distance from the mirror to the focusing lens and mirror. The directions of movement for the first and second elevation plates are orthogonal with respect to each other such that an X-Y movement is provided to the target beam image formed by the focusing lens.

The target image is formed in a plane and reflected by a beamsplitter mirror to a main objective lens which emanates the light focused at infinity.

A background light beam with background imagery is provided to the beamsplitter mirror and mixed with the target image so as to simulate the operating target environment encountered by an optically activated seeker.

OBJECTS OF THE INVENTION

It is an object of the present invention to provide a simulated target for an optically activated seeker and tracker.

Another object of the present invention is to provide a target for an optically activated seeker which has calibrated and variable target characteristics.

Another object of the present invention is to provide a simulated target for an optically activated seeker which simulates the three degrees of freedom of an actual maneuvering target.

A further object of the present invention is to provide a target for optically activated seekers which can be varied as to size, intensity, spatial position, color and interfering background.

A still further object of the present invention is to provide a target for optically activated seekers which superimposes a background image on the target for ascertaining the capability of the seeker for rejecting background targets.

Other objects, advantages and novel features of the present invention will become apparent from the following detailed description when considered in conjunction with the drawing.

BRIEF DESCRIPTION OF THE DRAWING

A more complete appreciation of the invention and many of the attendant advantages thereof will be readily understood by reference to the following detailed description when considered with the accompanying drawing which illustrates the target simulator of the subject invention.

DESCRIPTION OF THE PREFERRED EMBODIMENT

Referring to the FIGURE, there is illustrated an isometric view of a target simulator 10 for optically activated seekers and trackers such as infrared or laser guided projectiles.

The target for optically activated seekers and trackers (TOAST) is constructed with a first light source or illumination means 11 such as a continuous light source. The first light source may also be a discontinuous light source such as a pulsed light illuminator or chopped light source. Light source 11 is furnished with an aperture 12 through which is projected a target light beam 14. The characteristics of the light source may be chosen to provide for the spectral requirements of a given seeker having a particular spectral region such as ultraviolet, visible, near infrared or far infrared.

The target light beam illuminates a mechanical iris 15 which can be used to vary the diameter or cross-sectional area of target beam 14. The iris is adjustable from 1 to 50 mm., for example, and functions to change the size of the target. An increase in the diameter of the target beam increases the diameter of the target image as seen by the optically activated seeker.

After passing through iris 15, the target light beam is focused at infinity by collimator lens 16. With target beam 14 focused at infinity, the beam can be extended in length without affecting the focus of the beam.

With the target light beam focused at infinity, the beam is projected through several optical elements on an X-Y table 20 which function to vary the position of the target beam in the azimuth and elevation directions in the field of view of the seeker. Table 20 is constructed with a first elevation plate or platform 21 which is adapted for motion in opposite directions as indicated by arrows A in the FIGURE. Movement of platform 21 in the opposite directions indicated by arrows A simulates target pitch. Platform 21 is drivingly connected to a servo-motor 22 by a rack and pinion arrangement 23 so as to be capable of movement in a direction both toward and away from collimator lens 16 and light source 11. Although platform 21 is disclosed as being driven by servo-motor 22 and rack and pinion 23, it is to be understood that platform 21 may be driven by any suitable drive means.

As illustrated in the FIGURE, a mirror 24 is mounted on platform 21 so as to reflect target light beam 14 in a direction perpendicular to the motion of platform 21. Mirror 24 is stationary relative to platform 21 but moves with platform 21 in the opposite directions indicated by arrows A so as to lengthen or shorten the distance from collimator lens 16 to mirror 24.

After the target beam is reflected by mirror 24, it passes through one or more variable filters 25 which attenuate the intensity of the target beam. Variable filters 25 are positioned on and move with platform 21 and may be selectively driven by means of a servo-motor (not shown). Although variable filters 25 are illustrated as positioned on platform 21 to take advantage of the small aperture requirements at this location, it is to be understood that the variable filters can be positioned at any point along target light beam 14 where the small aperture characteristic exists.

Referring again to the FIGURE, after target beam 14 is attenuated by variable filters 25 the beam passes through one or more spectral filters 26 which provide for color selection of the target beam. The spectral filters 26 are used to select the spectral band of interest and are positioned on and move with platform 21 so as to take advantage of the small aperture requirements at this location. It is to be understood, however, that the spectral filters can be positioned at any point along target light beam 14 where the small aperture characteristic exists.

X-Y table 20 is also provided with a second elevation plate or platform 27 which is adapted for motion in opposite directions as indicated by arrows B in the FIGURE. Movement of platform 27 in the direction indicated by arrows B simulates target yaw. Platform 27 is positioned on and moves with platform 21. Platform 27 is drivingly connected to servo-motor 28 by rack and pinion arrangement 29 so as to be capable of movement both toward and away from mirror 24 on first platform 21. Although platform 27 is illustrated as being driven by servo-motor 28 and rack and pinion 29, it is to be understood that platform 27 may be driven by any suitable drive means.

A focusing lens 30 and attendant mirror 31 are positioned on and move with platform 27 so as to shorten or lengthen the optical distance from lens 30 to mirror 24. As seen by referring to the FIGURE, the movements of one motion mirror 24 and mirror 31 are orthogonal thus providing for movement of the image carried by target light beam 14 in the X plane and Y plane.

Lens 30 and mirror 31 serve to focus and reflect the image of the iris being carried by the target beam onto a plane 32. The orthogonal relationship of the mirror 24 with lens 30 and mirror 31 allows for selective X and Y coordinates, and spatial positioning of the target image in plane 32 which will be seen later to be correlated with the azimuthal and elevation of the target image as viewed by the seeker.

As shown in the FIGURE, mirror 31 reflects target beam 14 perpendicularly to plane 32. The target image focused in plane 32 by lens 30 is reflected by a beamsplitter mirror 33 to a main objective lens 34. Beamsplitter 33 and objective lens 34 are positioned such that plane 32 is at the focal distance of objective lens 34. Thus the target light beam emanating from the objective lens is focused at infinity.

Besides reflecting the target light beam to objective lens 34, beamsplitter 33 also combines the target light beam and the background light beam having a background image. The background image simulates the actual target environment and ascertains the capability of the seeker and tracker for distinguishing between the target and the background image.

Illumination for the background image is provided by a second light source or illumination means 40, having a large aperture 41. The intensity of the second light source can be varied as necessary for a particular application. The second light source illuminates a background image stencil 42 which is perforated with the imagery desired for the background. A background light beam 43, incorporating the background imagery, passes to beamsplitter 33 which combines background light beam 43 with target light beam 14 to form combined light beam 44 which is projected to objective lens 34.

An optically activated seeker and tracker 45 is positioned in a three-axis (three degree of freedom) gimbal (not shown) so as to view the combined target and background image through objective lens 34. The gimballed mounting system provides the seeker with all the angular inputs of guided missile flight except for those of the acceleration forces. When the seeker views through objective lens 34 it sees a target spot, that is projected by target light beam 14, and a surrounding interfering background imagery, that is projected by background light beam 43.

In some applications of simulated target 10, a field lens (not shown) may be positioned at plane 32 so as to control the distance from objective lens 34 to the optically activated seeker.

During operation of target simulator 10, target light beam 14 is projected by first light source 11 to mechanical iris 15 which develops a target spot diameter or cross-sectional area to simulate target image growth in size as the range diminshes. The target beam passes through collimator 16 which focuses the target beam at infinity and passes the beam on to a mirror 24 which is mounted on platform 21 of X-Y table 20.

The one motion mirror 24 reflects the target beam through variable filters 25 which can vary the target spot intensity by several orders of magnitude to simulate image intensity growth as range diminishes.

The target beam then passes through spectral filters 26, which selected the desired spectral band, and then also passes through lens 30 and mirror 31 mounted on platform 27 of X-Y table 20. The relative motions between platforms 21 and 27 of X-Y table 20, in conjunction with mirror 24 and lens 30 and mirror 31, can be used to vary the X-Y position of the target spot in plane 32. The spot direction from the seeker can be varied ±10 degrees or more in both azimuth and elevation, dependent on the optical characteristics of objective lens 34.

The target spot image is then reflected by beamsplitter 33 where it is combined with the background image 43 and presented to objective lens 34 as combined target-background image 44.

It is to be understood that first light source 11 can be a laser source provided with appropriate lens elements for illuminating iris 15. Likewise, second light source 40 may also be a laser source provided with appropriate lens elements. In addition, it is to be further understood that second light source 40 may duplicate all of the elements found in the target image light path such as light source 11, iris 15, collimator 16, variable filters 25, spectral filters 26, X-Y table 20, one motion mirror 24, lens 30, mirror 31 and focal plane 32 so as to present two competitive targets to beamsplitter 33 and seeker 45. The two competing targets would each be provided with variations in size, intensity, spectral emission and spatial position, as opposed to single variable target with a fixed background.

It is thus apparent that the target for optically activated seekers and trackers (TOAST) provides a three degree of freedom target which when used in combination with a three-axis gimballed mounting system for the seeker provides all the requirements for a six degree of freedom flight motion simulator. The target of the subject invention is calibrated and can be varied as to size, intensity and spatial position while at the same time the invention can superimpose a background image on the target for ascertaining the capability of the seeker for rejecting background targets.

Many obvious modifications and embodiments of the specific invention other than those set forth above will readily come to mind to one skilled in the art having the benefit of the teachings presented in the foregoing description and the accompanying drawings of the subject invention and hence it is to be understood that such modifications are included within the scope of the appended claims.

What is claimed as new and desired to be secured by Letters Patent of the United States is:

1. A simulated target for a weapon having an optically activated seeker, comprising:
   light source means generating a target light beam;
   adjustable means for varying the cross-sectional area of the target light beam;
   lens means for collimating the adjusted target light beam;
   first movable platform means provided with means for directing the collimated target light beam in a direction toward a second movable platform means;
   the second movable platform means movably mounted on the first platform means, the second movable platform means being comprised of an output lens for focusing the directed and collimated target light beam at a position in the focal plane of the output lens;
   means for selectively moving the first platform means relative to the collimating lens means and the second movable platform means relative to the first movable platform means so as to selectively position the focused target light beam on the focal plane of the output lens; and
   an objective lens mounted in relation to the first and second movable platform means so as to project an image of the target light beam as selectively positioned on the focal plane to the optically activated seeker.

2. A simulated target as set forth in claim 1 wherein the first movable platform means is further comprised of variable filter means interposed between the directing means and the output lens, the filter means being positionable by a servo-motor so as to selectively alternate the intensity of the collimated and directed target light beam projecting therethrough.

3. A simulated target as set forth in claim 1 wherein the first movable platform means is further comprised of variable filter means for selecting the spectrum of the collimated and directed target light beam as it projects through the filter means, the filter means being mounted on the first movable platform means and interposed between the output lens and the directing means.

4. A simulated target as set forth in claim 1 wherein the first movable platform means is further comprised of variable filter means and variable spectrum filter means, both filter means being interposed between the directing means and the output lens, the variable filter means for selectively alternating the intensity of the collimated and directed target light beam projecting therethrough.

5. A simulated target as set forth in claim 1 wherein the adjustable means is comprised of a mechanical iris.

6. A simulated target as set forth in claim 1 wherein the directing means is comprised of a mirror for directing the collimated and adjusted target light beam from one direction to another.

7. A simulated target as set forth in claim 6 wherein the mirror directs the target light beam from one direction to another so as to define an angle of approximately ninety degrees (90°) therebetween.

8. A simulated target as set forth in claim 1 wherein the means for selectively moving the first and second movable platform means is comprised of first and second servo-motor means respectively connected thereto so as to selectively move the first and second movable platform means in one direction together and the second movable platform means in another direction relative to the first movable platform.

9. A simulated target as set forth in claim 1 wherein the second movable platform means is further comprised of a mirror, the mirror being disposed adjacent to the output lens so as to direct the target light beam from one direction to another prior to focusing the directed target light beam on the focal plane.

10. A simulated target as set forth in claim 9 wherein the mirror directs the target light beam from one direction to another so as to define an angle of approximately ninety degrees (90°) therebetween.

11. A simulated target as set forth in claim 1 wherein the objective lens is positioned at a focal distance from the focal plane.

12. A simulated target as set forth in claim 1 wherein the target is further comprised of an additional light source means generating a background light beam; means interposed between the additional light source means and the output lens for directing and combining the target light beam and the background light beam so as to project a combined target light beam and background light beam image to the objective lens.

13. A simulated target as set forth in claim 12 wherein the combining and directing means is a beamsplitter.

14. A simulated target as set forth in claim 12 wherein the additional light source means includes a background image stencil so as to provide the background light beam with desired imagery.

* * * * *